(12) United States Patent
Lee et al.

(10) Patent No.: US 11,256,011 B2
(45) Date of Patent: *Feb. 22, 2022

(54) PATTERN GENERATION DEVICE

(71) Applicant: YOUNG OPTICS INC., Hsinchu (TW)

(72) Inventors: Yuan-Yu Lee, Hsinchu (TW); Ya-Ling Hsu, Hsinchu (TW)

(73) Assignee: YOUNG OPTICS INC., Hsinchu (TW)

( * ) Notice: Subject to any disclaimer, the term of this patent is extended or adjusted under 35 U.S.C. 154(b) by 103 days.

This patent is subject to a terminal disclaimer.

(21) Appl. No.: 16/402,665

(22) Filed: May 3, 2019

(65) Prior Publication Data

US 2019/0353832 A1  Nov. 21, 2019

(30) Foreign Application Priority Data

May 18, 2018  (TW) .................. 107117129

(51) Int. Cl.
| | |
|---|---|
| *G02B 5/18* | (2006.01) |
| *G02B 26/00* | (2006.01) |
| *G02F 1/00* | (2006.01) |
| *G02B 5/32* | (2006.01) |

(52) U.S. Cl.
CPC ............. *G02B 5/1842* (2013.01); *G02B 5/32* (2013.01)

(58) Field of Classification Search
CPC ...... G02F 1/0322; G02F 2203/50; G02F 1/29; G02F 1/0356; G02B 26/001; B82Y 20/00; A61F 9/067; G01J 1/32; G01J 1/4257
USPC ....... 359/259, 237, 245, 240, 238, 279, 322, 359/315–316; 350/201.1, 205; 356/121, 356/363
See application file for complete search history.

(56) References Cited

U.S. PATENT DOCUMENTS

| | | | |
|---|---|---|---|
| 2002/0158866 A1* | 10/2002 | Batchko | H04N 13/388 345/419 |
| 2010/0202725 A1* | 8/2010 | Popovich | G02B 5/1828 385/10 |
| 2019/0129085 A1* | 5/2019 | Waldern | G01B 11/2513 |

* cited by examiner

*Primary Examiner* — Dawayne Pinkney
(74) *Attorney, Agent, or Firm* — Muncy, Geissler, Olds & Lowe, PC (57) ABSTRACT

One embodiment of the invention provides a pattern generation device includes a light source, a first HPDLC cell, and a second HPDLC cell. The first HPDLC cell is disposed downstream of a light path of the light source and contains a first phase modulation pattern. The second HPDLC cell is disposed downstream of the light path of the first HPDLC cell and contains a diffraction grating pattern.

20 Claims, 13 Drawing Sheets

PATTERN GENERATION DEVICE

BACKGROUND OF THE INVENTION a. Field of the Invention

The invention relates to a pattern generation device.

b. Description of the Related Art

Nowadays, encoded or structured light is considered to be a reliable technology for purposes of mapping surface contours of objects. In a typical structured-light 3D scanning process, specific patterns are projected onto an object or a scene, and the projected patterns are then captured by an image pick-up device from one or more perspectives. The structured light patterns may be composed of lines, grids or more complicated geometric shapes. Because structured light patterns have been encoded, positional relationships between reference points and projection points in the captured image can be easily found out. Therefore, the depth coordinate of each point can be found by triangulation based on the local shift to reconstruct a three-dimensional (3D) map of an object. This 3D mapping technique relying on structured light can be used in various applications, such as depth measurements, distance measurements, component inspection, reverse engineering, gesture recognition, and creation of three dimensional maps.

BRIEF SUMMARY OF THE INVENTION

In one aspect of the present disclosure, a pattern generation device includes a light source, a first holographic polymer dispersed liquid crystal (HPDLC) cell, and a second HPDLC cell. The first HPDLC cell is disposed downstream of a light path of the light source and contains a first phase modulation pattern. The second HPDLC cell is disposed downstream of a light path of the first HPDLC cell and contains a diffraction grating pattern. A power supply is electrically connected to the first HPDLC cell and the second HPDLC cell and capable of supplying a voltage to the first HPDLC cell and the second HPDLC cell. When the power supply does not supply a voltage to the first HPDLC cell, a light beam travelling through the first HPDLC cell is converted into an image beam with an image pattern in correspondence with the first phase modulation pattern. Then, the power supply may supply or not supply a voltage to the second HPDLC cell to allow the light beam incident to the second HPDLC cell to be deflected at an angle or travels through the second HPDLC cell in a substantially straight direction. Finally, the image beam is projected onto an object.

In another aspect of the present disclosure, a pattern generation device includes a light source, a first grating, a second grating, and a holographic optical element. The first grating is switchable between a non-diffracting and a diffracting state and disposed downstream of a light path of the light source, and the second grating is switchable between a non-diffracting and a diffracting state and disposed downstream of a light path of the first grating. The holographic optical element is disposed downstream of a light path of the second grating, and the holographic optical element encodes a phase modulation pattern in correspondence with an image pattern. A power supply is electrically connected to the first grating and the second grating and capable of supplying a voltage to the first grating and the second grating. By supplying a voltage to either the first grating or the second grating, a light beam from the light source may be deflected by the first grating at a first angle or deflected by the second grating at a second angle and then incident to the holographic optical element. The light beam is converted by the holographic optical element into an image beam with an image pattern in correspondence with the phase modulation pattern, and the image beam may be deflected at an angle or not deflected and finally projected onto an object.

According to the above aspects, a pattern generation device having low power dissipation and low fabrication costs is provided, and the pattern generation device may provide periodic patterns and more collimatable light beams to expand applications of structured light.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF THE INVENTION

In the following detailed description of the preferred embodiments, directional terminology, such as "top," "bottom," "front," "back," etcetera, is used with reference to the orientation of the Figure(s) being described. The components of the invention can be positioned in a number of different orientations. As such, the directional terminology is used for purposes of illustration and is in no way limiting. Further, "First." "Second," etcetera, as used herein, are used as labels for nouns that they precede, and do not imply any type of ordering (e.g., spatial, temporal, logical, etcetera).

Figure 1:
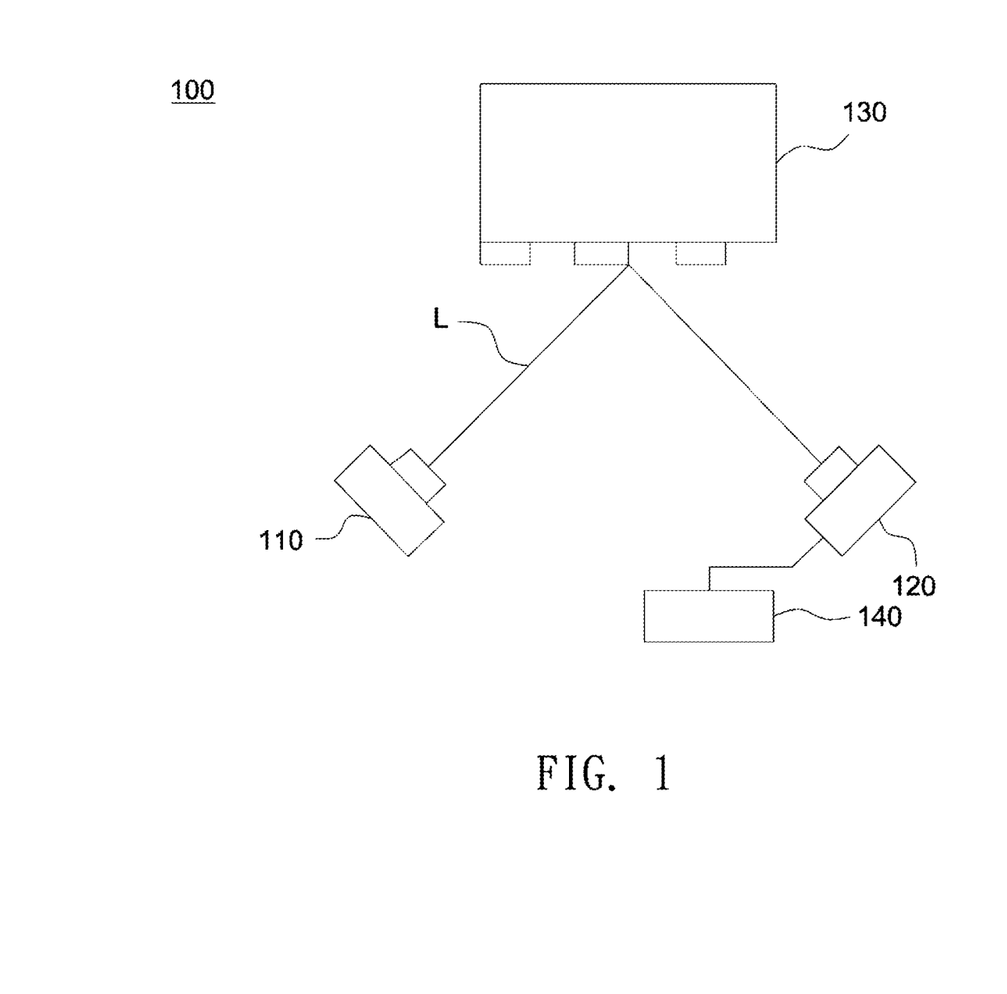
FIG. 1 shows a schematic diagram of a depth mapping system according to an embodiment of the invention.

FIG. 1 shows a schematic diagram of a depth mapping system. Referring to FIG. 1, a depth mapping system 100 includes a pattern generation device 110 and an image pick-up device 120. The depth mapping system 100 measures depth coordinate values of the surface of an object 130 at each point within a predefined field of view, where the pattern generation device 110 projects a structured light pattern onto the object surface and the image pick-up device 120 captures an image of the structured light pattern on the object surface to obtain the depth coordinate values. Specifically, the pattern generation device 110 is used to project a light beam L of encoded/structured light onto the surface of the object 130. The depth mapping system 100 may further include a calculation unit 140. The calculation unit 140 is electrically connected to the image pick-up device 120 to find a depth map of the object 130 according to an image of the light beam L on the object surface captured by the image pick-up device 120. For example, the depth map of the object 130 is generated by decoding the light beam L and by the triangulation approach. The image pick-up device 120 may be a device with a CCD or a CMOS, such as a camera, a mobile phone, or a portable device. The calculation unit 140 may be an operational processor such as a CPU, an MCU, a DSP, an MPU or a GPU.

Figure 2:
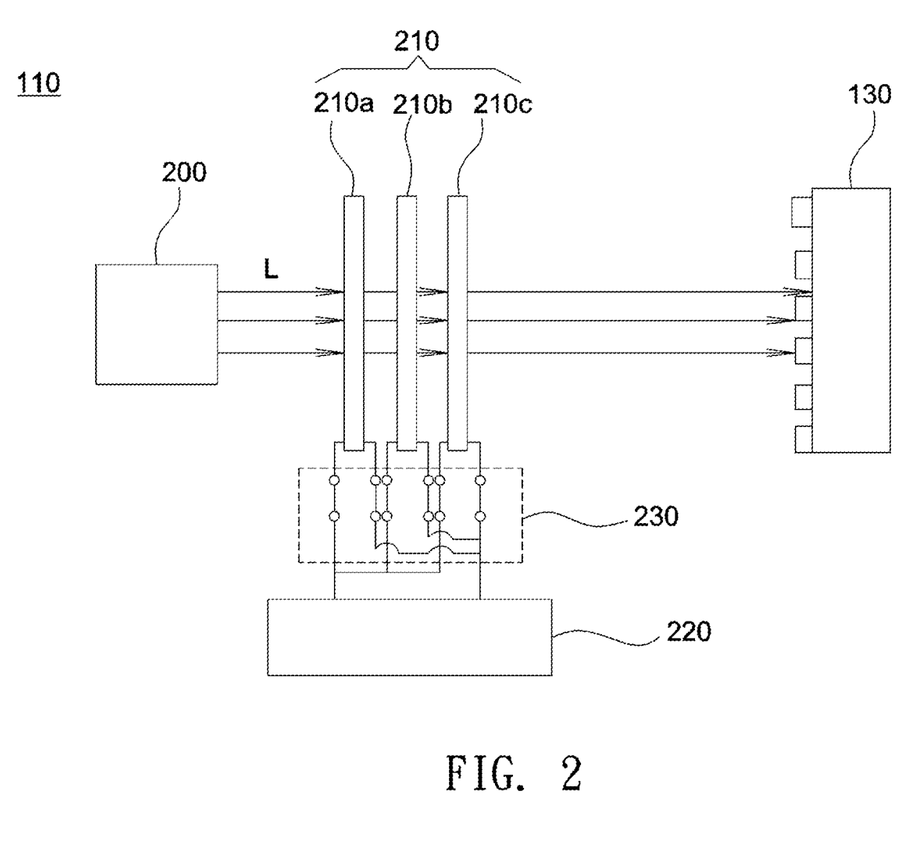
FIG. 2 shows a schematic diagram of a pattern generation device according to an embodiment of the invention.
Figure 3A:
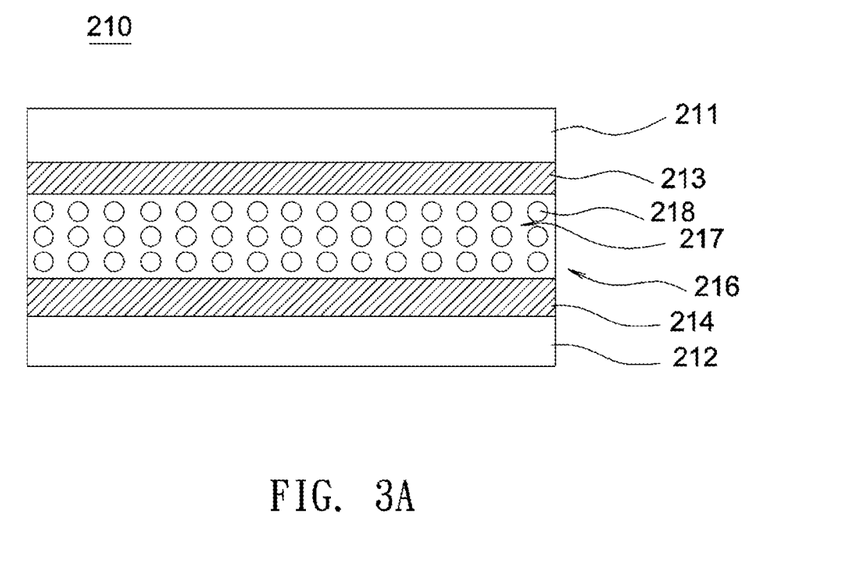
FIG. 3A and FIG. 3B respectively show a cross-sectional view and a perspective view of a holographic polymer dispersed liquid crystal (HPDLC) cell.
Figure 3B:
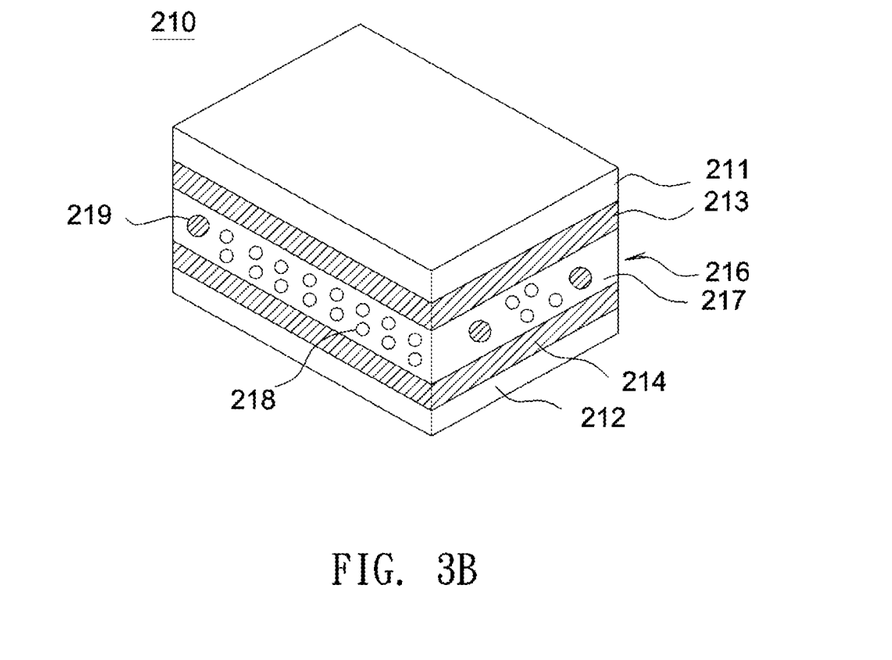

FIG. 2 shows a schematic diagram of a pattern generation device 110 according to an embodiment of the invention. FIG. 3A and FIG. 3B respectively show a cross-sectional view and a perspective view of a holographic polymer dispersed liquid crystal (HPDLC) cell. In one embodiment, a HPDLC cell 210 is a grating switchable between a diffracting state and a non-diffracting state. As shown in FIG. 2, the pattern generation device 110 includes a light source 20, multiple HPDLC cells 210 (such as HPDLC cells 210a-210c), a power supply 220 and multiple switches 230. In one embodiment, the power supply 220 supplies a voltage signal to the HPDLC cells 210. In other embodiment, the power supply 220 supplies a current signal to the HPDLC cells 210. A light beam L emitted from the light source 200 passes through the HPDLC cells 210 and reaches the surface of the object 130. Further, by controlling respective on/off states of the multiple switches 230, the power supply 220 may selectively supply or not supply a voltage signal to the HPDLC cells 210a-210c. The light source 200 may be a single-point type, a multipoint type or a surface type light source, and the light source 200 may include, but is not limited to, a laser, a laser diode, an LED, an OLED, a vertical-cavity surface-emitting laser (VCSEL), an edge-emitting laser, a bulb, or a light-emitting unit capable of emitting thermal-spectrum radiation (such as infrared light or other invisible light).

Referring to FIG. 3A and FIG. 3B, an HPDLC cell 210 includes a top glass substrate 211, a bottom glass substrate 212, transparent electrodes 213 and 214, a HPDLC layer 216 and multiple beads 219. The top glass substrate 211 and the bottom glass substrate 212 are spaced at an interval, and the transparent electrodes 213 and 214 are respectively disposed on inner surfaces of the glass substrates 211 and 212. The HPDLC layer 216 is disposed between the transparent electrode 213 and the transparent electrode 214 and is composed of polymers 217 and liquid crystals 218. The light beam L from the light source 200 may pass various HPDLC cells 210 along a propagation path determined by whether respective HPDLC cells 210 are supplied with a voltage or current and by prescribed patterns defined by polymers 217 and liquid crystals 218. The different refractive indices of polymers 217 and liquid crystals 218 may cause light diffraction effects. The beads 219 are disposed between the transparent electrode 213 and the transparent electrode 214 to maintain a thickness of the HPDLC layer 216. The beads 219 are not limited to having a specific number. For example, each of the top side and the bottom side of the HPDLC layer 216 is preferably provided with at least two beads. In one embodiment, the transparent electrodes 213 and 214 are formed from indium tin oxide (ITO) conductive films.

Figure 4A:
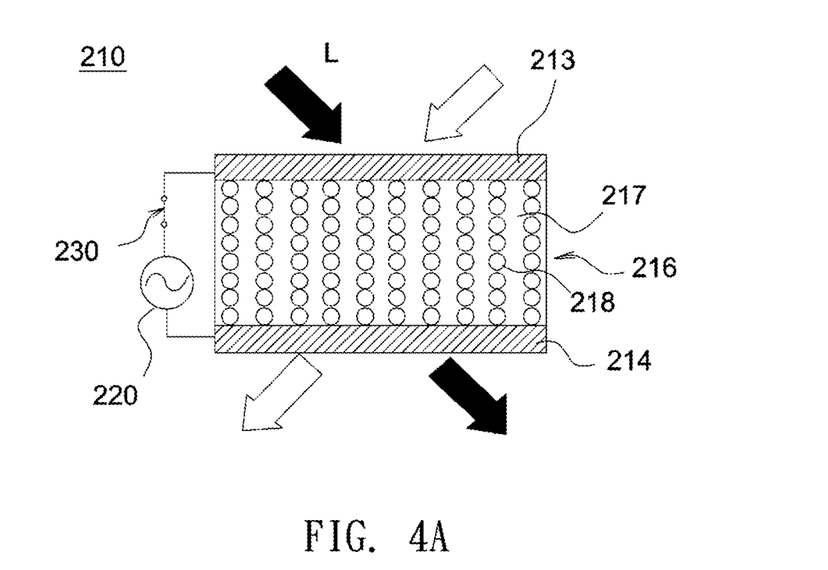
FIG. 4A shows a cross-section of a HPDLC cell supplied with a voltage and FIG. 4B shows a cross-section of the HPDLC cell not supplied with a voltage.
Figure 4B:
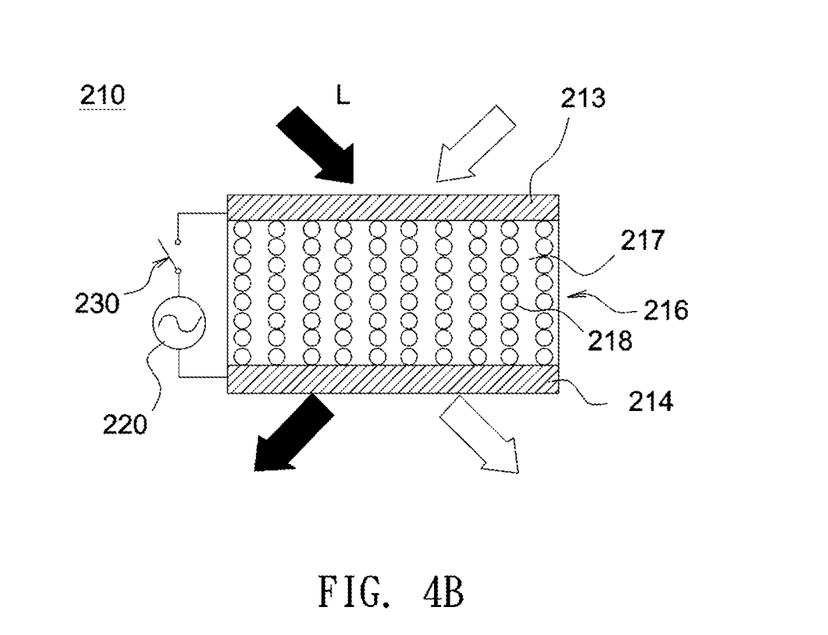

FIG. 4A and FIG. 4B show a HPDLC cell functioning as a grating switchable between a diffracting state and a non-diffracting state, where FIG. 4A shows a cross-section of a HPDLC cell supplied with a voltage and FIG. 4B shows a cross-section of the HPDLC cell not supplied with a voltage. When a voltage is applied to the HPDLC cell (grating) 210 switchable between a diffracting state and a non-diffracting state, molecules of liquid crystals 218 are oriented according to a prescribed pattern as shown in FIG. 4A. Therefore, the refractive index of liquid crystals 218 is substantially the same as that of polymers 217, and a light beam L from the light source 200 may, when reaching the HPDLC cell (grating) 210, travel though molecules of liquid crystals 218 in an almost straight direction without being subject to optical interference. In one embodiment, the transmittance of the light beam L may reach 98% or above. In comparison, when no voltage is applied to the HPDLC cell (grating) 210 switchable between a diffracting state and a non-diffracting state, molecules of liquid crystals 218 are oriented according to another prescribed pattern as shown in FIG. 4B. Therefore, the different refractive indices of polymers 217 and liquid crystals 218 result in light diffraction effects, and thus the light beam L incident to the HPDLC cell 210 is subject to optical interference to exit the HPDLC cell 210 in a direction different to the incident direction; that is, the light beam L is deflected by the HPDLC cell 210 as shown in FIG. 4B.

Figure 5:
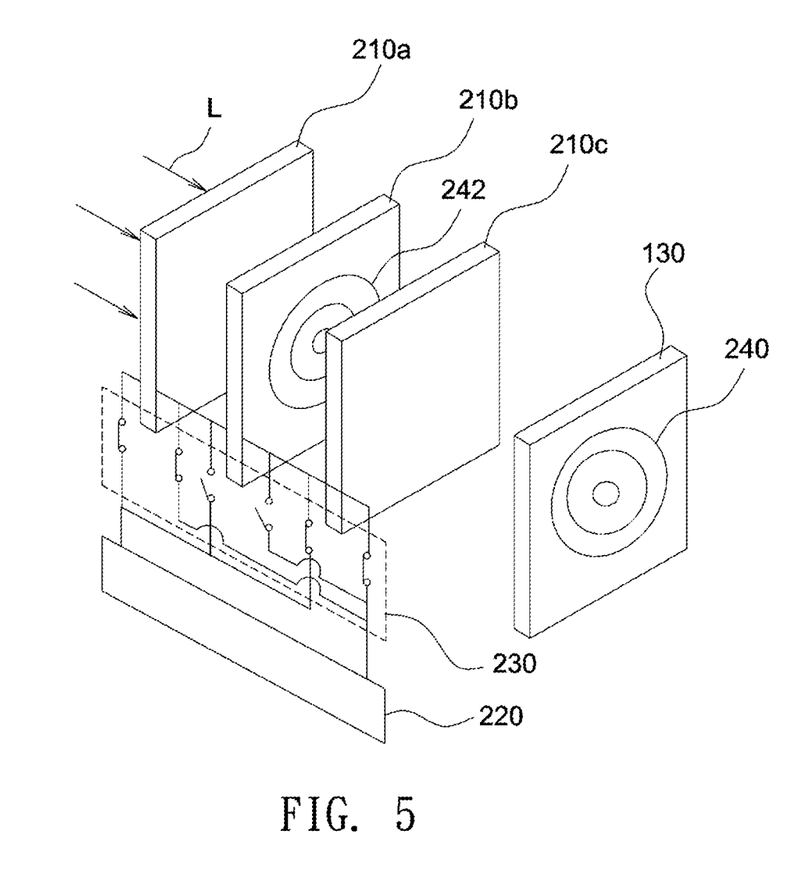
FIG. 5 shows a schematic diagram of an image pattern projected on an object by a pattern generation device according to an embodiment of the invention.

Except for serving as a grating switchable between a diffracting state and a non-diffracting state to vary the light exit direction, the HPDLC cell 210 may also contain phase modulation information corresponding to an image pattern to be projected on the object surface. In one fabrication example, polymers 217 outsides a phase modulation pattern region is exposed to a light beam to be cured. Therefore, liquid crystals 218, which have a certain degree of fluid property, is pushed by the curing polymers 217 in the HPDLC layer 216 and flow into the phase modulation pattern region. Therefore, when no voltage is applied to the HPDLC cell 210 and a light beam L is incident to the HPDLC cell 210 containing a phase modulation pattern, an image pattern corresponds to the phase modulation pattern is displayed on the object 130. Referring to FIG. 5, in one embodiment, a voltage is applied to HPDLC cells 210a and 210c but not applied to a HPDLC cell 210b by controls of multiple switches 230. Therefore, a light beam L from the light source 200 passes through the HPDLC cell 210a and the HPDLC cell 210b in succession (i.e., the HPDLC cell 210b is disposed downstream of a light path of the HPDLC cell 210a) and is converted relying on a phase modulation pattern 242 of the HPDLC cell 210b into an image beam with a pattern 240 that corresponds to the phase modulation pattern 242. Then, the image beam with the pattern 240 passes through the HPDLC cell 210c without any modification or conversion to display the pattern 240 on the surface of the object 130.

Figure 6A:
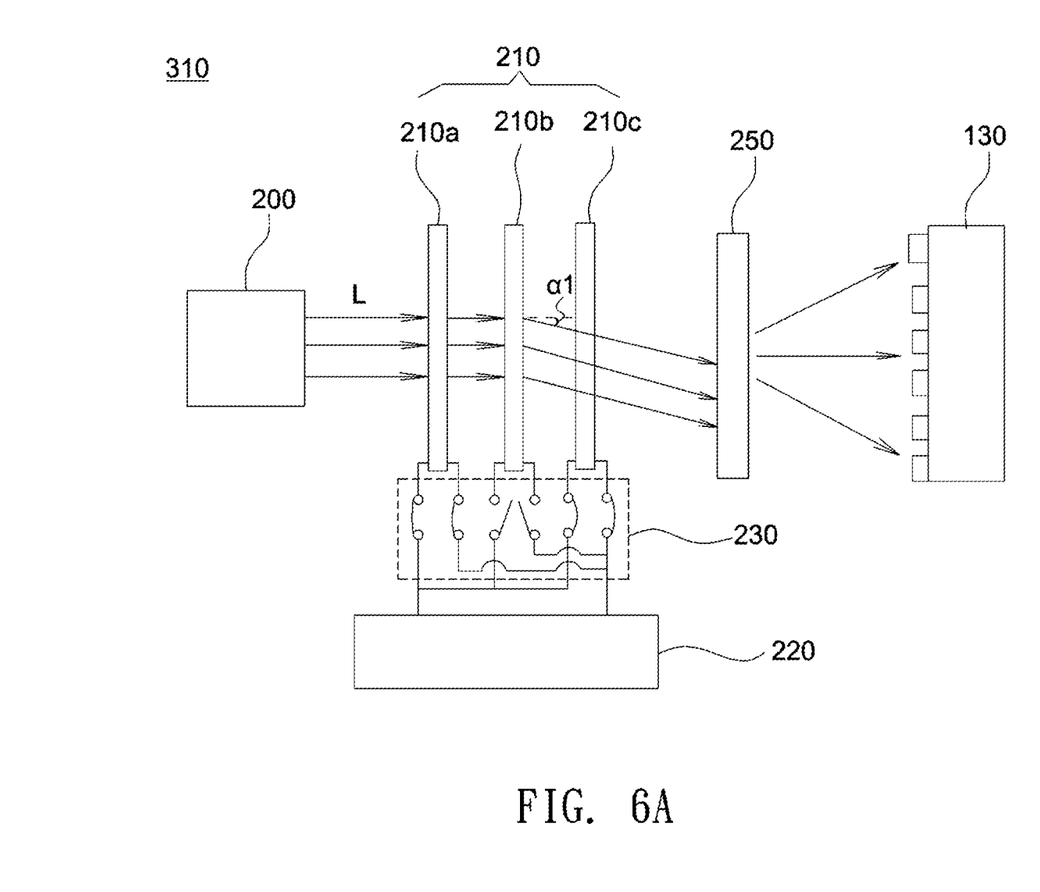
FIGS. 6A and 6B show schematic diagrams of a pattern generation device under different operating conditions according to another embodiment of the invention.
Figure 6B:
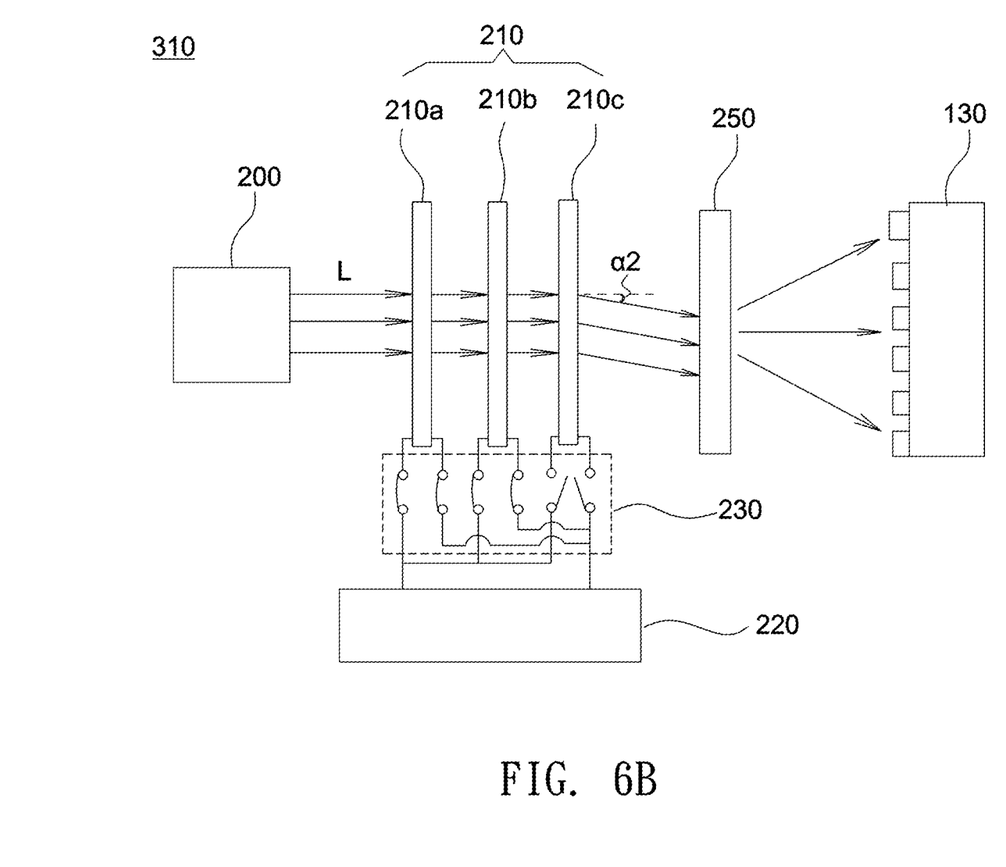
Figure 6C:
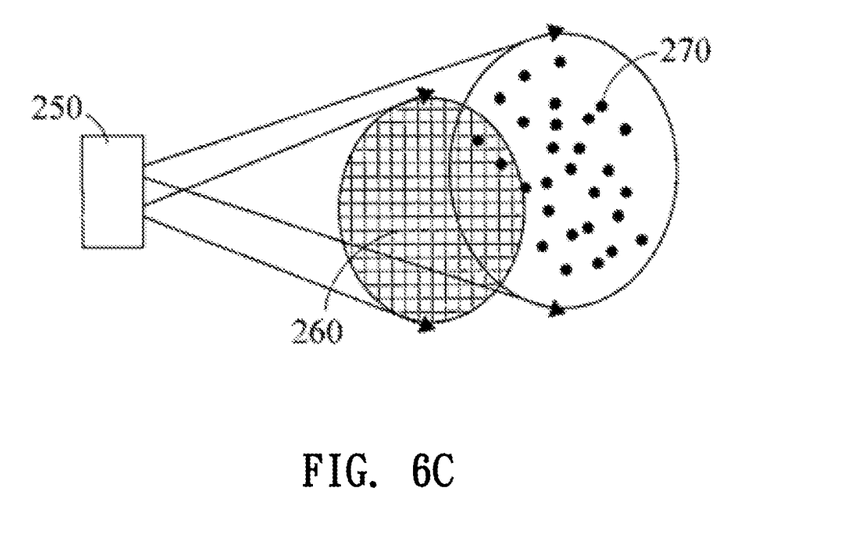
FIG. 6C shows a schematic diagram of different image patterns projected on an object by a pattern generation device according to an embodiment of the invention.

FIG. 6A and FIG. 6B illustrate a pattern generation device 310 according to another embodiment of the invention. In FIG. 6A and FIG. 6B, identical components are denoted by the same numerals as in the above embodiments and their descriptions provided above will not be repeated here. In this embodiment, each HPDLC cell 210 is a grating switchable between a diffracting state and a non-diffracting state to alter the exit angle of the light beam L, and the HPDLC cells 210 are used with a holographic optical element 250, such as a hologram, that generates different holographic images as a result of different angles of incidence of a light beam impinging thereon. FIG. 6A illustrates a condition where a voltage is applied to the HPDLC cells 210a and 210c but not applied to the HPDLC cell 210b by controls of multiple switches 230. As shown in FIG. 6A, a light beam L from a light source 200 passes through the HPDLC cell 210a in a substantially straight direction and is incident to the HPDLC cell 210b. The light beam L is deflected by the HPDLC cell 210b at an angle α1 and then incident to the HPDLC cell 210c. Then, the light beam L passes through the HPDLC cell 210c in a substantially straight direction and is incident to the holographic optical element 250 (such as a hologram) to display an image pattern 260 on the object 130 (shown in FIG. 6C) by the holographic optical element 250 encoding a phase modulation pattern (not shown) corresponding to the image pattern 260. FIG. 6B illustrates a condition where a voltage is applied to the HPDLC cell 210a and HPDLC cell 210b but not applied to the HPDLC cell 210c by controls of multiple switches 230. As shown in FIG. 6B, a light beam L from the light source 200 passing through the HPDLC cell 210a and HPDLC cell 210b in a substantially straight direction is incident to the HPDLC cell 210c. The light beam L is deflected by the HPDLC cell 210c at an angle α2 and then incident to the holographic optical element 250 (such as a hologram) to display an image pattern 270 on the object 130 (FIG. 6C) by the holographic optical element 250 encoding a phase modulation pattern (not shown) corresponding to the image pattern 270. Note that the phase modulation pattern is an interference pattern that enables a device to reproduce the original light field and finally form an image pattern. Therefore, the image patterns 260 and 270 projected on the surface of the object 130 are different to the phase modulation pattern of the holographic optical element 250.

Figure 6D:
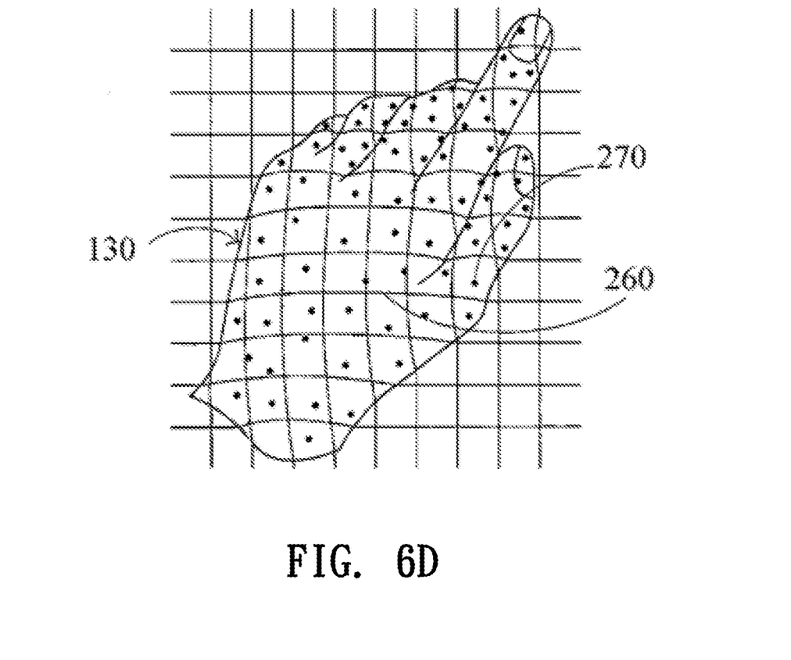
FIG. 6D shows a schematic diagram of different image patterns projected on a hand by a pattern generation device according to an embodiment of the invention.

As shown in FIG. 6D, in one embodiment, the object 130 is a hand, and the hand gesture may cause distance differences between different surface tiles of a hand and an image pick-up device 120. The image pick-up device 120 may capture an image of the hand and thus fetch image patterns 260 and 270 on the object (hand) 130. Therefore, a different depth of each tile of the hand is obtained by detecting positional relationships between the image pattern 260 and the image pattern 270. Note the resolution of each tile of the hand is determined by the style of the image patterns 260 and 270. For example, a smaller pitch among line patterns and/or point patterns may increase the resolution of each tile. Further, the pattern described in various embodiments of the invention is not limited to a specific style or construction. For example, the pattern may include multiple strips of equal width or with different widths and may have irregular, periodic, point or linear shapes.

Figure 7A:
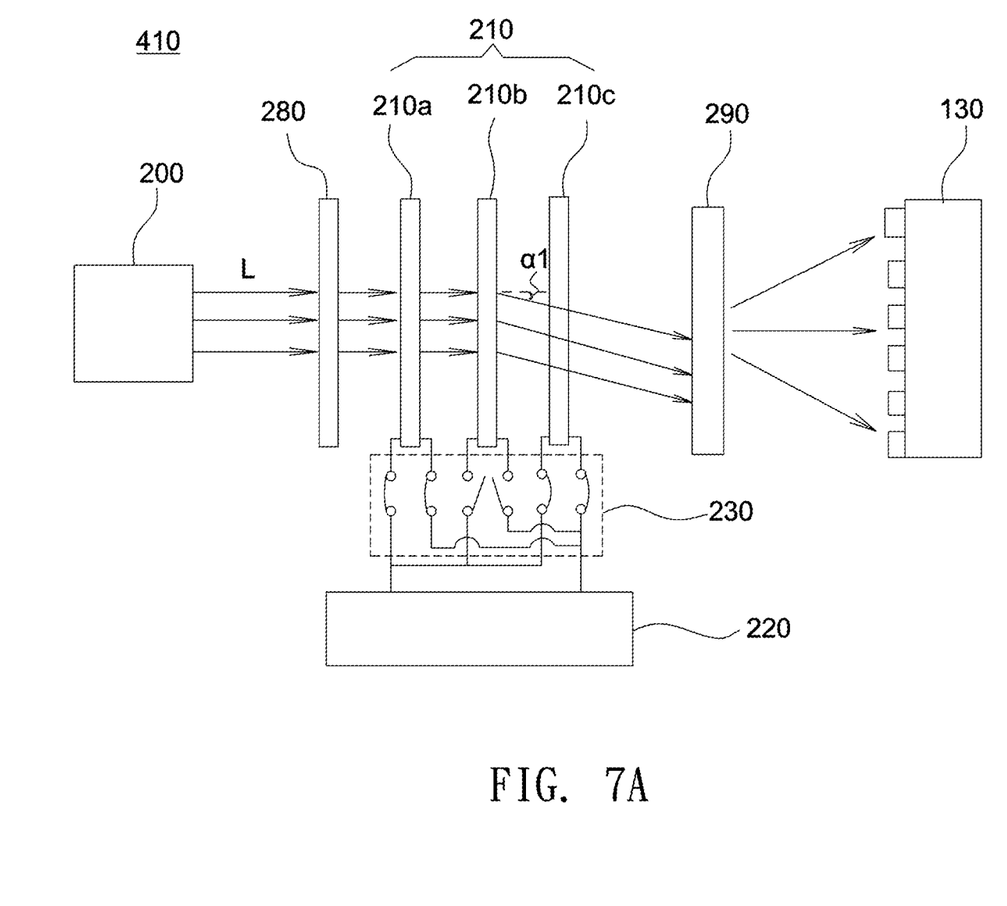
FIGS. 7A and 7B show schematic diagrams of a pattern generation device under different operating conditions according to another embodiment of the invention.
Figure 7B:
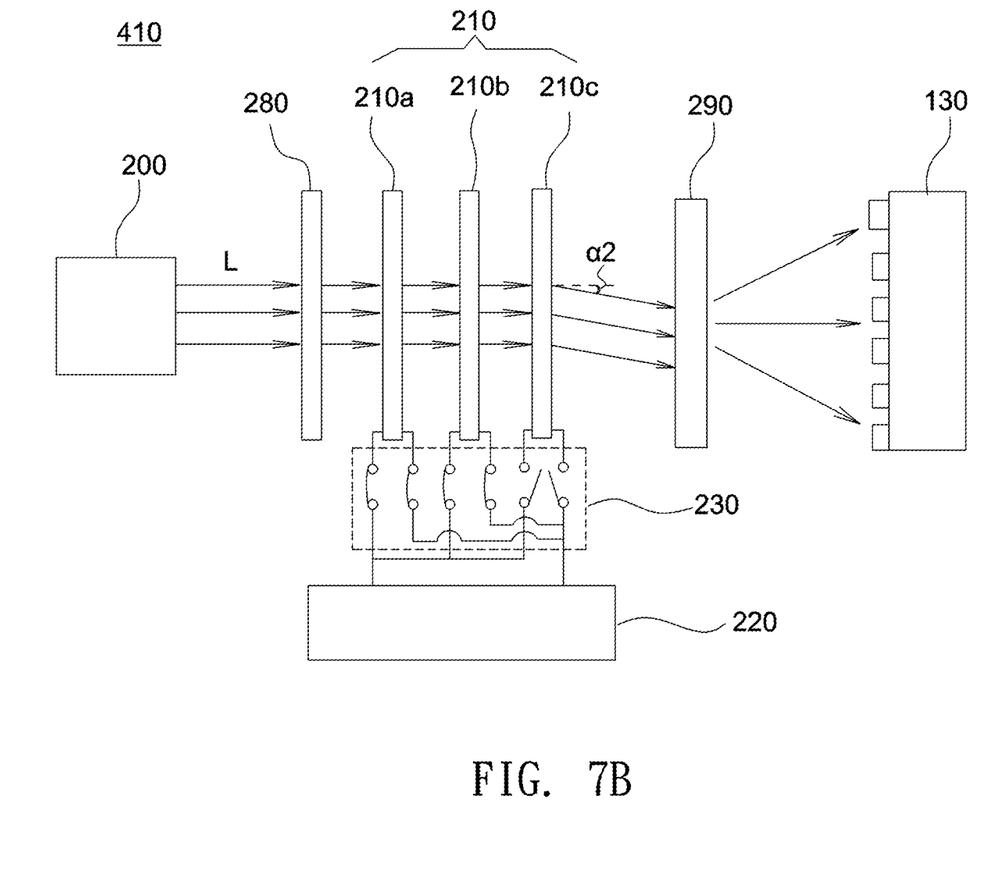

FIG. 7A and FIG. 7B illustrate a pattern generation device 410 according to another embodiment of the invention. In FIG. 7A and FIG. 7B, identical components are denoted by the same numerals as in the above embodiments and their descriptions provided above will not be repeated here. In this embodiment, each HPDLC cell 210 is a grating switchable between a diffracting state and a non-diffracting state to alter the exit angle of the light beam L, and the HPDLC cells 210 is used with a projection lens 290 and a transparent substrate 280 containing a pattern (not shown). The projection lens 290 is disposed downstream of a light path of the gratings. FIG. 7A illustrates a condition where a voltage is applied to the HPDLC cell 210a and HPDLC cell 210c but not applied to the HPDLC cell 210b by controls of multiple switches 230. As shown in FIG. 7A, a light beam L from a light source 200 first passes through the transparent substrate 280 containing a pattern (not shown) in a substantially straight direction to be converted into an image beam with the pattern. Then, the image beam with the pattern passes through the HPDLC cell 210a and reaches the HPDLC cell 210b in a substantially straight direction, and is deflected by the HPDLC cell 210b at an angle α1 and then incident to the HPDLC cell 210c. Thereafter, the image beam with the pattern passes through the HPDLC cell 210c in a substantially straight direction and projected by the projection lens 290 to display the pattern of the transparent substrate 280 on the object 130. FIG. 7B illustrates a condition where a voltage is applied to the HPDLC cell 210a and HPDLC cell 210b but not applied to a HPDLC cell 210c by controls of multiple switches 230. As shown in FIG. 7B, a light beam L from a light source 200 first passes through the transparent substrate 280 provided with a pattern (not shown) in a substantially straight direction to be converted into an image beam with a pattern, and then the image beam with the pattern passes through the HPDLC cell 210a and the HPDLC cell 210b in succession in a substantially straight direction and reaches the HPDLC cell 210c. The image beam with the pattern is deflected by the HPDLC cell 210c at an angle α2 and projected by the projection lens 290 to display the pattern of the transparent substrate 280 on the object 130. Though FIG. 7A and FIG. 7B both show that an identical pattern of the transparent substrate 280 is displayed on the object 130, the mutually different deflection angles α1 and α2 may cause a displacement between two identical patterns. Therefore, the image of the object 130 captured by the image pick-up device 120 may include two identical patterns provided with a displacement, and a depth of each surface tile of the object 130 is obtained by detecting positional relationships between the two identical patterns provided with a displacement.

In one embodiment, the transparent substrate 280 may be replaced with a light valve. The term "light valve", which is commonly known in the projector industry, refers to individually-addressed optical units of a spatial light modulator. The spatial light modulator includes multiple individually-addressed optical units arranged as a one-dimensional or a two-dimensional array. Each optical unit can be individually addressed by optical or electrical signals to alter its optical properties through various physical effects (e.g., Pockels effect, Kerr effect, photoacoustic effect, pagneto-optic effect, self electro-optic effect and photorefractive effect. Therefore, the multiple individually addressed optical units may modify incoming light beams and output image beams. The optical units may be, for example, micro mirrors or liquid crystal cells, and the light valve may be a digital micromirror device (DMD, a liquid-crystal-on-silicon panel (LCOS panel) or a transmissive type LCD panel. Further, the transparent substrate 280 may be a mask or a projection slide.

Figure 8:
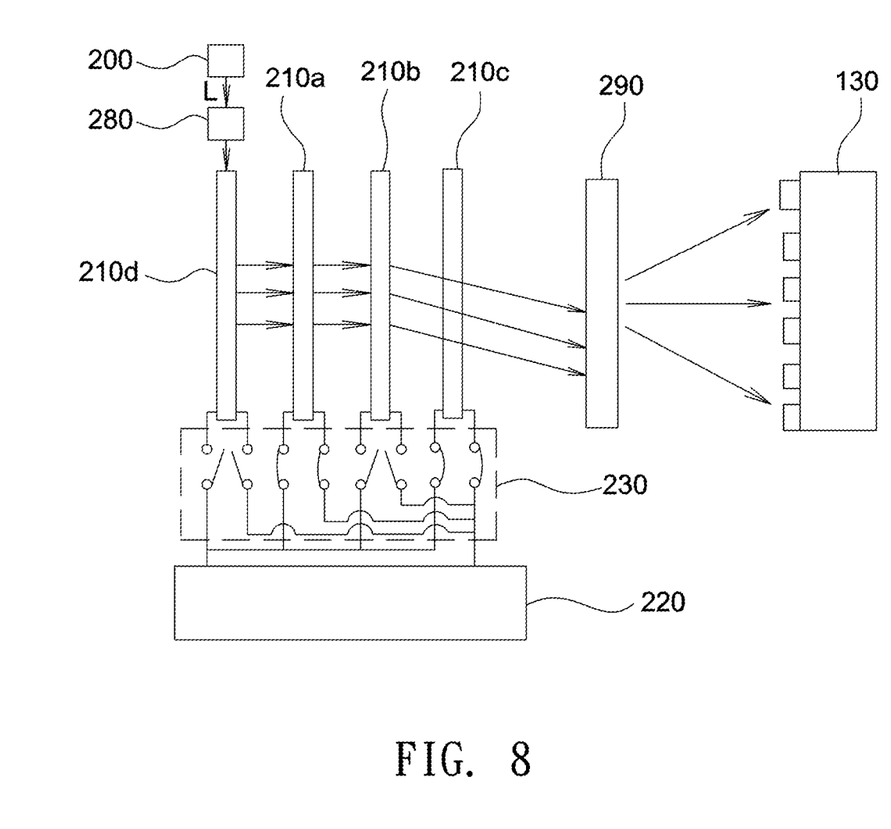
FIG. 8 shows a schematic diagram of a pattern generation device according to another embodiment of the invention.

FIG. 8 illustrates a pattern generation device according to another embodiment of the invention. In FIG. 8, identical components are denoted by the same numerals as in the above embodiments and their descriptions provided above will not be repeated here. The pattern generation device of this embodiment is different to the pattern generation device 410 in that the light source 200 and the transparent substrate 280 provided with a pattern are disposed on a lateral side of an HPDLC cell 210d. Therefore, a light beam L from the light source 200 first passes through the transparent substrate 280 containing a pattern (not shown) to be converted into an image beam with the pattern, and then the image beam with the pattern is bent by the HPDLC cell 210d at an angle of about 90 degrees and further incident to the HPDLC cell 210a. The subsequent propagation path of the image beam is similar to the above embodiments and thus is not repeatedly described here.

Figure 9A:
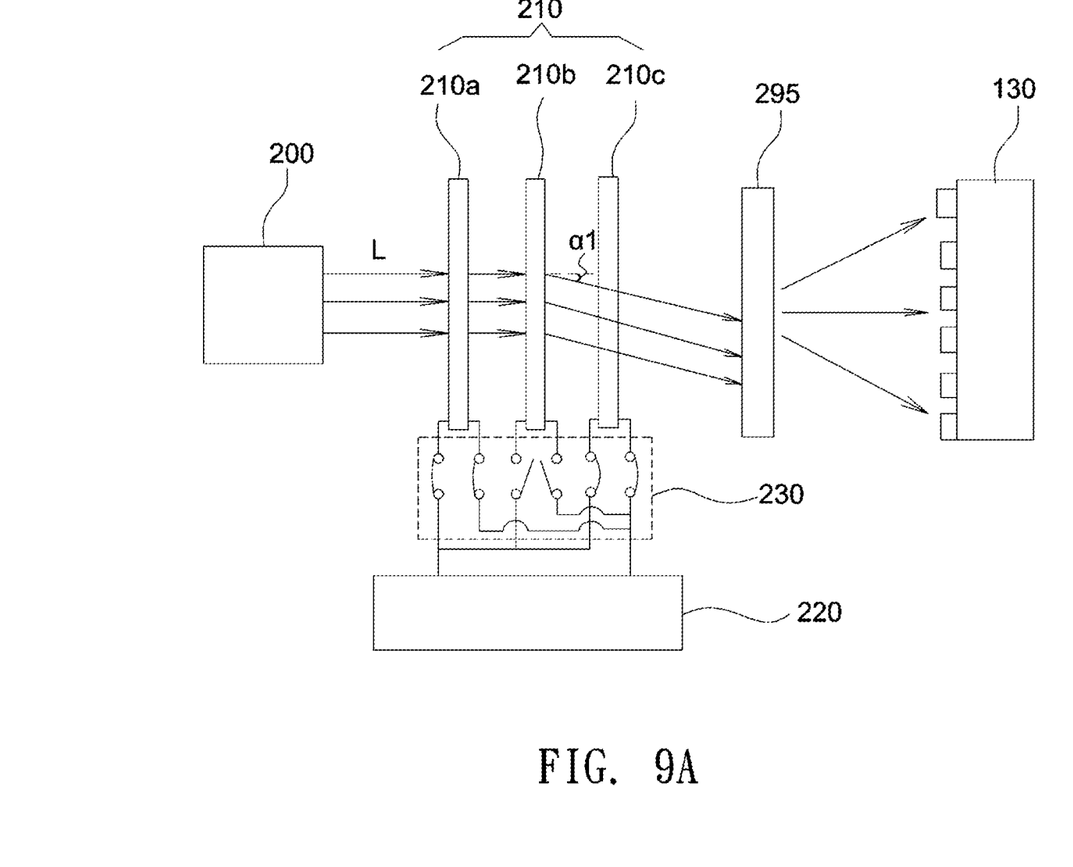
FIGS. 9A and 9B show schematic diagrams of a pattern generation device according to another embodiment of the invention.
Figure 9B:
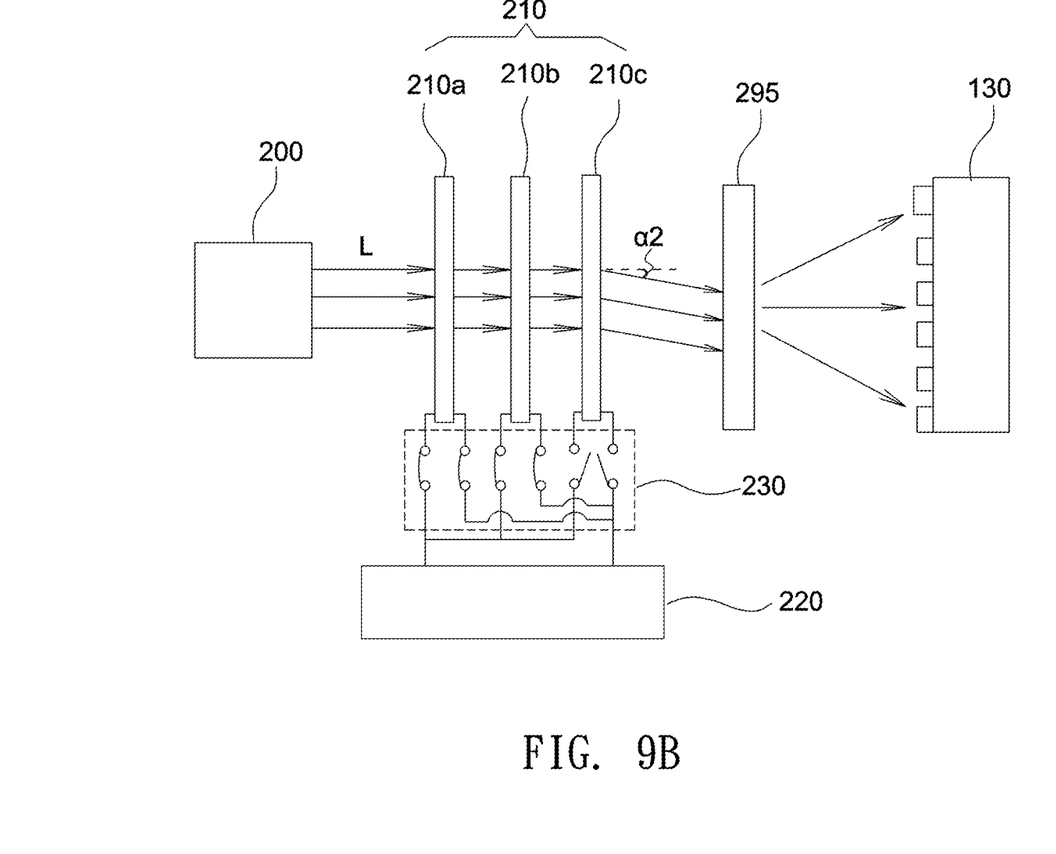

FIGS. 9A and 9B illustrate a pattern generation device according to another embodiment of the invention. In FIGS. 9A and 9B, identical components are denoted by the same numerals as in the above embodiments and their descriptions provided above will not be repeated here. The pattern generation device in this embodiment is different to the pattern generation device 310 in that the holographic optical element 250 is replaced with a diffractive optical element (DOE) 295. As shown in FIGS. 9A and 9B, since two different deflection angles α1 and α2 can be formed by controls of multiple switches 230 and deflection of the HPDLC cells 210, a displacement between two identical patterns projected by the DOE 295 onto the object 130 can be produced. Therefore, the image of the object 130 captured by the image pick-up device 120 may include two identical patterns provided with a displacement, and a depth of each surface tile of the object 130 is obtained by detecting positional relationships between the two identical patterns provided with a displacement.

According to the above embodiment, a pattern generation device having low power dissipation and low fabrication costs is provided, and the pattern generation device may provide periodic patterns and more collimatable light beams to expand applications of structured light.

Though the embodiments of the invention have been presented for purposes of illustration and description, they are not intended to be exhaustive or to limit the invention. Accordingly, many modifications and variations without departing from the spirit of the invention or essential characteristics thereof will be apparent to practitioners skilled in this art. For example, the power transmission may be achieved by direct contact, indirect contact (via rigid or non-rigid intermediate objects) or actions at a distance (such as a magnetic force). Further, a connection between two elements is not limited to a direct direction and may be alternatively realized by the use of an intermediate object, such as a movable mechanical element, a controlling mechanical element, or a connection mechanical element, without influencing the power transmission. Therefore, unless limited otherwise, the terms "connected," "coupled," and "mounted" and variations thereof herein are used broadly and encompass direct and indirect connections, couplings, and mountings. It is intended that the scope of the invention be defined by the claims appended hereto and their equivalents in which all terms are meant in their broadest reasonable sense unless otherwise indicated.

What is claimed is:

1. A pattern generation device, comprising:
   a light source for emitting a light beam;
   a first holographic polymer dispersed liquid crystal (HPDLC) cell disposed downstream of a light path of the light source and containing a first phase modulation pattern; and
   a second HPDLC cell disposed downstream of a light path of the first HPDLC cell and containing a diffraction grating pattern, wherein the light beam travels through the first HPDLC cell and the second HPDLC cell in succession, the light beam leaving the second HPDLC cell has at least one structured light pattern, and the at least one structured light pattern is capable of being deformed into a deformed projection pattern configured to be captured to allow calculation of depth or surface information of an object surface based on positional shift of the deformed projection pattern.

2. The pattern generation device as claimed in claim 1, further comprising a power supply electrically connected to the first HPDLC cell and the second HPDLC cell.

3. The pattern generation device as claimed in claim 2, wherein, when the power supply does not supply a voltage to the first HPDLC cell, the first HPDLC cell is in a diffracting state, and the light beam travelling through the first HPDLC cell is converted into an image beam with the structured light pattern in correspondence with the first phase modulation pattern.

4. The pattern generation device as claimed in claim 2, wherein, when the power supply does not supply a voltage to the second HPDLC cell, the second HPDLC cell is in a diffracting state and the light beam incident to the second HPDLC cell is deflected by the second HPDLC cell at an angle.

5. The pattern generation device as claimed in claim 2, wherein, when the power supply supplies a voltage to the first HPDLC cell and the second HPDLC cell, the first HPDLC cell and the second HPDLC cell are in the non-diffracting state, and the light beam travels through the first HPDLC cell and the second HPDLC cell in a substantially straight direction.

6. The pattern generation device as claimed in claim 2, wherein a light path of the second HPDLC cell is determined by whether the power supply supplies or does not supply a voltage to the second HPDLC cell.

7. The pattern generation device as claimed in claim 1, wherein the light beam travelling through the first HPDLC cell is converted into an image beam with the structured light pattern in correspondence with the first phase modulation pattern, and then the light beam is deflected at an angle by the second HPDLC cell or travels through the second HPDLC cell in a substantially straight direction.

8. The pattern generation device as claimed in claim 1, wherein the light source is a laser, a laser diode, an LED, an OLED, a vertical-cavity surface-emitting laser, an edge-emitting laser, a bulb, or a light-emitting unit capable of emitting thermal-spectrum radiation.

9. The pattern generation device as claimed in claim 1, wherein the light beam forms a prescribed image pattern on an image plane.

10. The pattern generation device as claimed in claim 1, wherein the deformed projection pattern is configured to be captured by a capture device, and the capture device comprises an image pick-up device.

11. The pattern generation device as claimed in claim 1, wherein a depth mapping system comprises an image pick-up device to capture the deformed projection pattern and a calculation unit, and the calculation unit is electrically connected to the image pick-up device to find a depth map of an object.

12. A pattern generation device, comprising:
    a light source for emitting a light beam;
    a first grating switchable between a non-diffracting state and a diffracting state and disposed downstream of a light path of the light source;
    a second grating switchable between a non-diffracting state and a diffracting state and disposed downstream of a light path of the first grating; and a holographic optical element disposed downstream of a light path of the second grating, and the holographic optical element encoding a first phase modulation pattern, wherein the light beam travels through the first grating, the second grating and the holographic optical element in succession, the light beam leaving the holographic optical element has a first structured image pattern in correspondence with the first phase modulation pattern, and the first structured image pattern is capable of being deformed into a deformed projection pattern configured to be captured by a capture device to allow calculation of depth or surface information of an object surface based on positional shift of the deformed projection pattern.

13. The pattern generation device as claimed in claim 12, further comprising a power supply electrically connected to the first grating and the second grating.

14. The pattern generation device as claimed in claim 13, wherein, when the power supply supplies a voltage to the first grating and the second grating, the first grating and the second grating are in the non-diffracting state, and the light beam travels through the first grating and the second grating in a substantially straight direction.

15. The pattern generation device as claimed in claim 13, wherein, when the power supply does not supply a voltage to the first grating and the second grating, the first grating and the second grating are in the diffracting state, the light beam incident to the first grating is deflected by the first grating at a first angle, and the light beam incident to the second grating is deflected by the second grating at a second angle different to the first angle.

16. The pattern generation device as claimed in claim 12, wherein the light beam from the light source is either deflected by the first grating at a first angle or deflected by the second grating at a second angle, and the deflected light beam is incident to the holographic optical element and converted by the holographic optical element into an image beam with the first structured image pattern in correspondence with the phase modulation pattern.

17. The pattern generation device as claimed in claim 12, wherein the light source is a laser, a laser diode, an LED, an OLED, a vertical-cavity surface-emitting laser, an edge-emitting laser, a bulb, or a light-emitting unit capable of emitting thermal-spectrum radiation.

18. The pattern generation device as claimed in claim 12, wherein the light beam forms a prescribed image pattern on an image plane.

19. The pattern generation device as claimed in claim 12, wherein the pattern generation device is integrated in a depth mapping system, the depth mapping system comprises the capture device and a calculation unit, the capture device comprises an image pick-up device, and the calculation unit is electrically connected to the image pick-up device to find a depth map of an object.

20. A fabrication method for a pattern generation device, comprising:
provising a light source for emitting a light beam;
disposing a first holographic polymer dispersed liquid crystal (HPDLC) cell containing a first phase modulation pattern downstream of a light path of the light source; and
disposing a second HPDLC cell containing a diffraction grating pattern downstream of a light path of the first HPDLC cell, wherein the light beam travels through the first HPDLC and the second HPDLC in succession, the light beam leaving the second HPDLC has at least one structured light pattern, and the at least one structured light pattern is capable of being deformed into a deformed projection pattern configured to be captured to allow calculation of depth or surface information of an object surface based on positional shift of the deformed projection pattern.

* * * * *